Feb. 21, 1950 W. A. HYLAND 2,498,606
ADJUSTABLE GEARING
Filed July 16, 1945 3 Sheets-Sheet 1
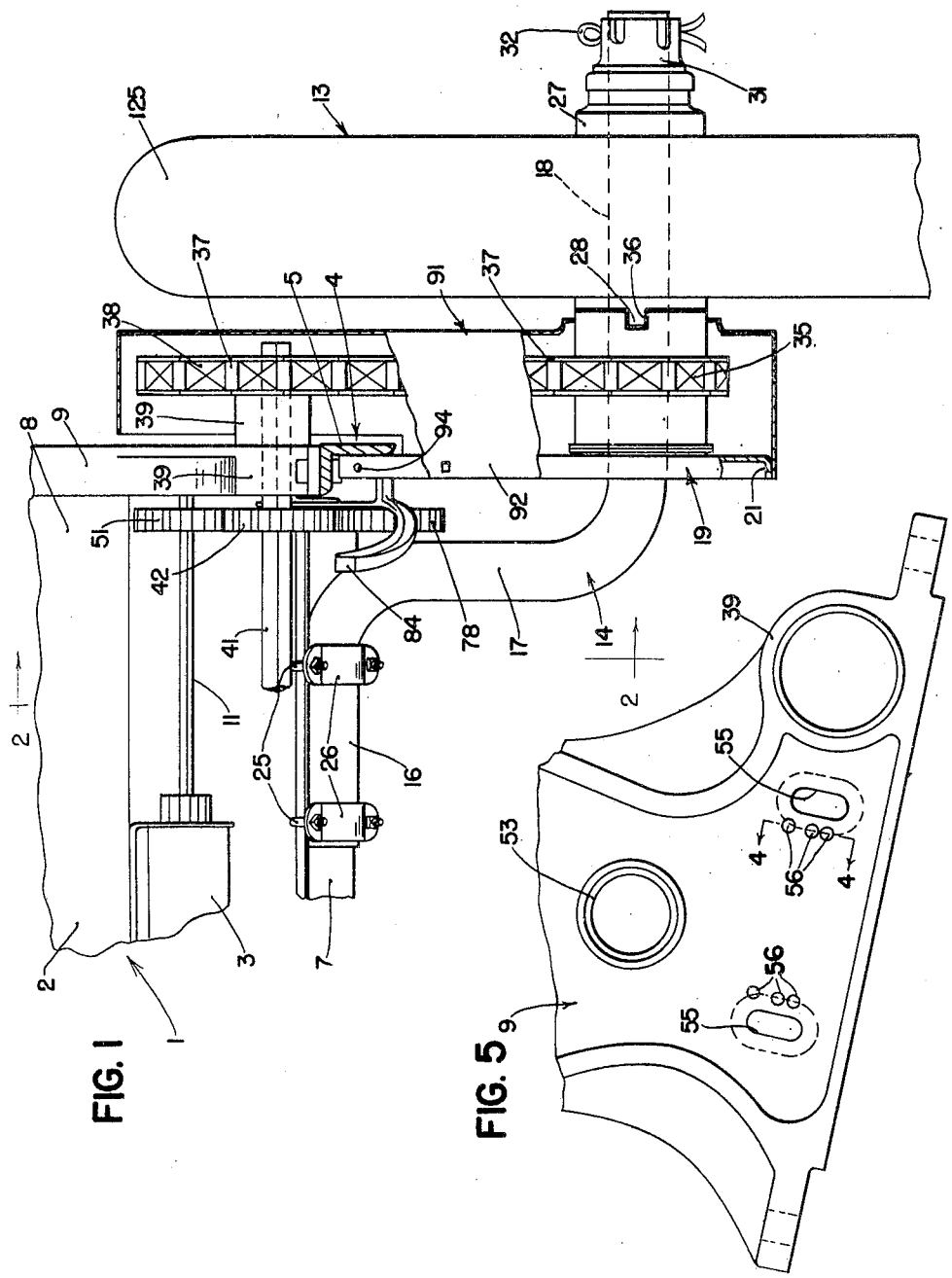
INVENTOR.
WILLIAM A. HYLAND
BY
ATTORNEYS Feb. 21, 1950    W. A. HYLAND    2,498,606
ADJUSTABLE GEARING
Filed July 16, 1945    3 Sheets-Sheet 2
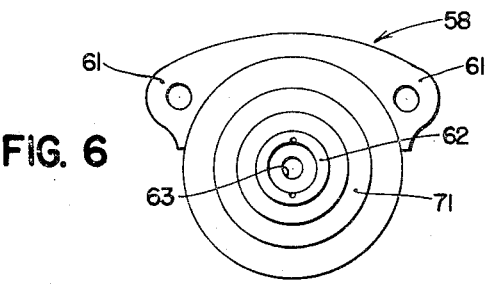
FIG. 6
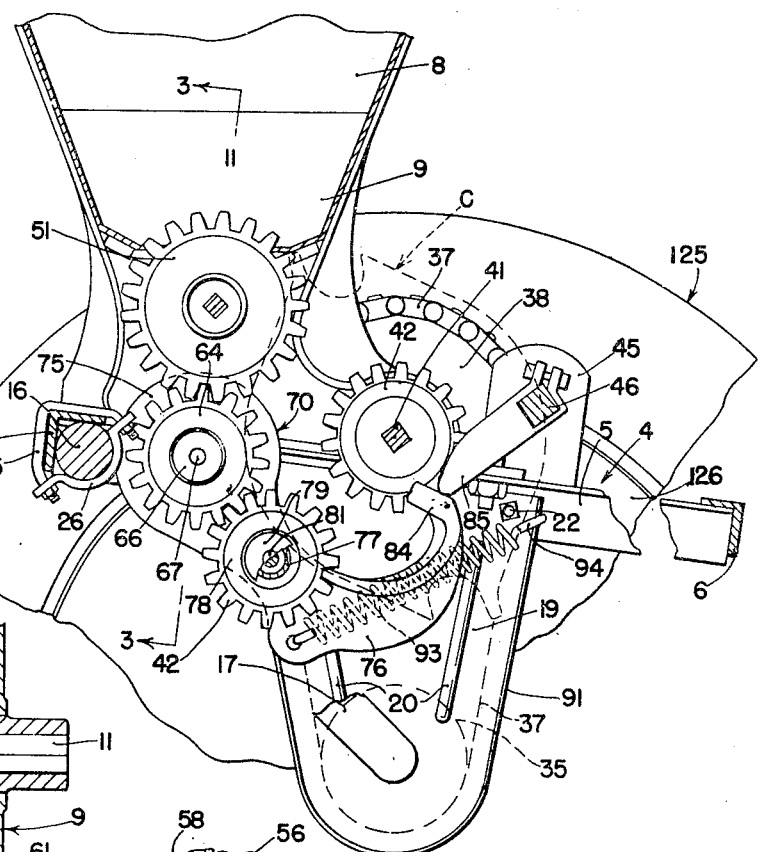
INVENTOR.
WILLIAM A. HYLAND
BY
ATTORNEYS Feb. 21, 1950     W. A. HYLAND     2,498,606
ADJUSTABLE GEARING
Filed July 16, 1945     3 Sheets-Sheet 3
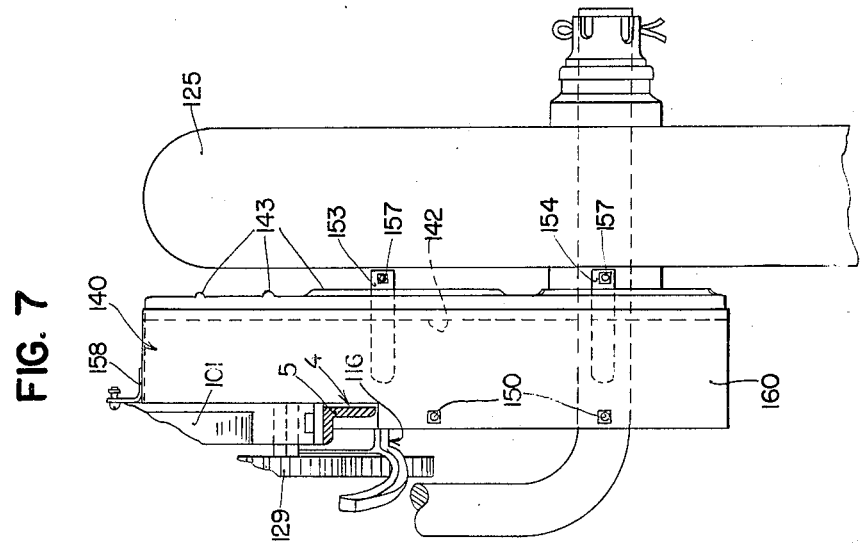
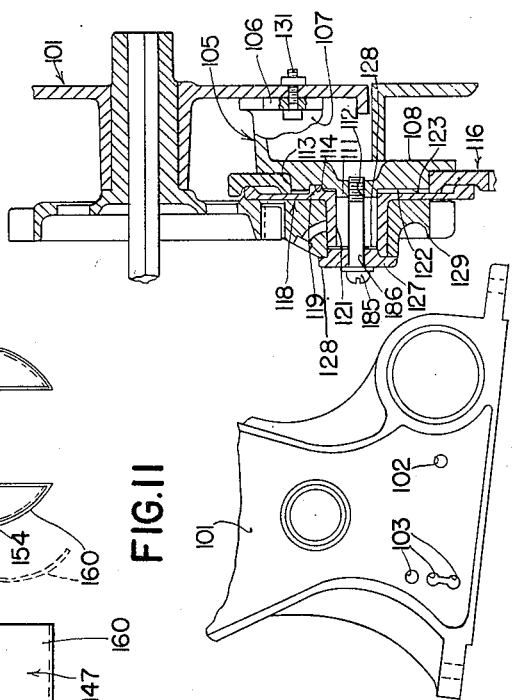
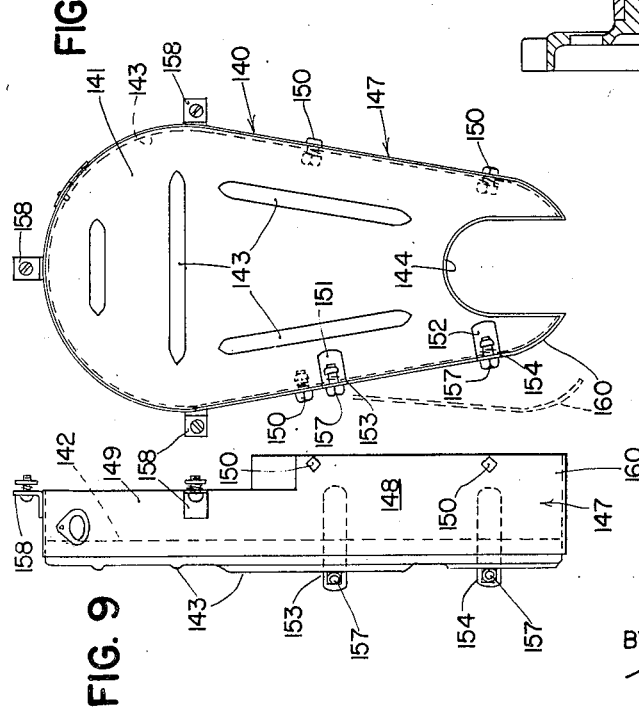
INVENTOR.
WILLIAM A. HYLAND
BY
ATTORNEYS Patented Feb. 21, 1950

2,498,606

UNITED STATES PATENT OFFICE 2,498,606

ADJUSTABLE GEARING

William A. Hyland, Horicon, Wis., assignor to John Deere Van Brunt Company, a corporation of Wisconsin Application July 16, 1945, Serial No. 605,372

17 Claims. (Cl. 74—405)

This application is a continuation-in-part of my co-pending application, Serial No. 545,915, filed July 21, 1944, for Grain drill, now forfeited.

The present invention relates generally to agricultural implements and more particularly to grain drills.

The object and general nature of the present invention is the provision of new and improved driving connections between the ground wheels and the seeding mechanism. Still further, another feature of the present invention is the provision of a new and improved swinging gear hanger unit for engaging and disengaging the drive to the feed shaft of the seeding mechanism.

These and other objects and advantages of the present invention will be apparent to those skilled in the art after a consideration of the following detailed description, taken in conjunction with the accompanying drawings in which the preferred form of the invention has been shown by way of illustration.

In the drawings:

Figure 1 is a front view of one end of a grain drill in which the principles of the present invention have been incorporated, certain parts being broken away.

Figure 2 is a sectional view taken generally along the line 2—2 of Figure 1.

Figure 3 is a section taken generally along the line 3—3 of Figure 2.

Figure 4 is a fragmentary view showing the optional mounting of a gear hanger pivot member and corresponds to a section taken along the line 4—4 of Figure 5.

Figure 5 is a fragmentary view of the grain drill and bracket, showing the position for adjustable mounting of the gear hanger pivot member.

Figure 6 is a detail view of the gear hanger pivot member.

Figure 7 is a fragmentary view of a grain drill similar to that shown in Figure 1, showing a modified form of chain housing.

Figure 8 is a sectional view, similar to Figure 3 showing an improved mounting for the gear hanger.

Figures 9 and 10 are side and end views of an improved chain guide which encloses the means for driving the gearing shown in Figure 8.

Figure 11 is a fragmentary view of the form of grain drill end bracket shown in Figures 7 and 8.

Referring now more particularly to the drawings, the implement in which the principles of the present invention have been illustrated comprises a grain drill, indicated in its entirety by the reference numeral 1, which is made up of a transversely extending seed box 2 carrying along the bottom thereof a plurality of seed dispensing units 3. The seed box 2 is supported on a frame 4 which includes transversely extending front and rear frame angles 6 and 7 and a plurality of longitudinally extending frame members including end members 5, which are secured in any suitable manner to the front and rear members 6 and 7. The frame 1 also includes a hitch structure by which the drill may be connected to a source of propelling power, such as a tractor or the like. The seed box 2 includes box ends 8 that receive end supporting brackets 9 which form the means whereby the seed box 2 is mounted on the frame 4. The supports 9 are apertured to receive a seeding shaft 11 which actuates the various seeding units 3 and receives power from the ground wheels of the grain drill.

Each end of the frame is supported on a ground wheel unit 13. Each of the ground wheel units 13 comprises a drop axle 14 that is made up of a shaft bent into generally Z formation, thereby providing an upper horizontal axle section 16, a downwardly extending or depending section 17, and a laterally outwardly extending wheel-receiving section 18. Secured as by welding to the axle section 18 is a sheet metal strut 19 which is ribbed, as at 20, for strength and also is flanged, as at 21, for the same purpose. The upper portion of the strut is apertured so as to be bolted, as at 22, to the vertical flange of the associated end frame angle 5, and the horizontal section 16 of the axle 14 is disposed inside the rear frame angle 7 and rigidly secured thereto by a pair of U-bolts 25 and clamping cap members 26. Normally the depending section 17 of the axle extends downwardly and forwardly and the strut section 19 is secured to the wheel-receiving section 18 of the axle so that when connected to the frame the strut section extends substantially vertically upwardly from the wheel-receiving axle section 18 to the frame end angle 5. The strut section 19 is of generally upwardly diverging or triangular configuration to provide the necessary strength without unnecessary weight. As best shown in Figure 1, the strut 19 is disposed laterally outwardly of the depending axle section 17 and is in the plane of the frame end angle 5.

Mounted on each of the axles 14 is a ground wheel 125. Each wheel is of relatively small diameter as compared with conventional grain drill supporting wheels, so as to make it possible to utilize automobile tires, either new or used. This has the advantage of providing a relatively inexpensive wheel; for, tires of this type, due to the mass production conditions under which they are manufactured, are much cheaper than special type tires. Each wheel 125 includes a wheel body 126 receiving a pneumatic or other tire and a hub 27 to which the wheel body is connected in any suitable manner. The hub 27 is provided with a plurality of lugs 28, preferably two, and the hub 27 is mounted for rotation on the wheel-receiving section 18 of the axle 14, being held in position thereon by any suitable means, such as a cap 31 and a cotter 32. The inner end of the wheel hub 27 is extended laterally inwardly beyond the plane of the inner face of the wheel and provides a support for a drive sprocket 35 which is provided with a pair of slots 36 to receive the lugs 28 mentioned above. A chain 37 is trained about the sprocket 35 at its lower end and at its upper end is trained over a sprocket 38 which is journaled for rotation in a bearing structure 39 formed on the supporting bracket 9 and which also receives the outer end of a jackshaft 41. A driving gear 42 is fixed in any suitable manner to the jackshaft 41 laterally inwardly of the bearing structure 39. Also, each frame end angle 5 carries a supporting bracket 45 adjacent the bearing structure 39, and each bracket 45 receives a rockable pressure shaft 46 to which pressure arms are attached. The pressure arms are connected with the several furrow openers (not shown) for the purpose of applying pressure to the furrow openers when they are in their lowered or operating position and for raising them into their transport position, according to the position of the rockshaft 46. Generally, a self-interrupting clutch, such as the one shown in the copending U. S. application filed by John H. Starr and myself March 30, 1944, Serial No. 528,795, now U. S. Patent 2,432,897, issued December 16, 1947, is employed for raising and lowering the furrow openers. The clutch which is indicated at C in Figure 2, preferably is actuated by the jackshaft 41 for optionally operating the pressure shaft 46.

The crank axle construction, its attachment to the frame, and the chain and sprocket drive are claimed in my co-pending application mentioned above.

The mechanism for driving the seeding shaft 11 from the ground wheel 125 will now be described. A gear 51 is provided with an elongated hub section 52 which is journaled for rotation in a bearing section 53 formed on the box and support member 9. The hub section 52 receives the seeding shaft 11 in non-rotatable relation. Each box end support member 9 is provided with a pair of vertical slots 55 and, adjacent thereto, a plurality of recesses 56. Extending through each pair of slots 55 are bolts 57 which fasten to the member 9 a gear hanger pivot member 58. The latter is provided with a pair of projections 59 which may be disposed in any of the several pairs of openings or recesses 56 so as to dispose the pivot member 58 in different positions with respect to the axis of rotation of the seeding drive gear 51. The hanger support member 58 is of special construction, embodying an upper pair of apertured lugs 61 to receive the bolts 57, the lower portion of the pivot member 58 being disposed in laterally outwardly spaced overhanging relation, as best shown in Figure 3, so as to clear the horizontal flange of the associated frame end angle 5. The gear hanger pivot member 58 is provided with a stud 62 and is apertured, as at 63. The stud 62 receives an idler gear 64 which is held in place on the stud 62 by means of a cap 66 and a bolt 67 which holds the cap in place.

A swinging gear hanger, indicated in its entirety by the reference numeral 70, is mounted for swinging movement on a shouldered section 71 formed on the gear hanger pivot member 58 just inwardly of the gear 64. Preferably, thrust washers 72 are disposed between the gear 64 and the shouldered section 71 on which the gear hanger 70 is mounted. The latter member, as best shown in Figure 3, comprises a hub section 75 adapted to be mounted on the shouldered section 71 of the pivot member 58 and a depending section 76 which, adjacent the section 75, carries a laterally outwardly directed stud 77 (Figure 2) on which a second idle gear 78 is mounted for rotation. The gear 78 meshes with the idler gear 64 and the latter, in turn, meshes with the seeding shaft drive gear 51. The gear 78 is held in place by a cap member 79 and a bolt 81 that extends through the stud section 77 on the gear hanger 70. The depending section of the gear hanger 70 is extended forwardly and also laterally inwardly, to form an abutment section 84 that is adapted to be engaged by an arm 85 carried by the pressure shaft 46, whereby whenever the latter is operated to raise the furrow openers, the arm 85 engages the gear hanger section 84 and swings the same about its pivotal support on the member 58 so as to carry the gear 78 out of mesh with the gear 42 that is fixed to the jackshaft 41. Thus, whenever the furrow openers are raised, the drive from the ground wheel to the seeding shaft is automatically interrupted, and when the pressure shaft is rocked in a direction to move the furrow openers into their operating position, the drive between the ground wheels and the seeding shaft or shafts is automatically reestablished. A chain guard 91 is disposed about the driving chain 37 and comprises a sheet metal enclosure, also ribbed for strength, which includes side flanges, extended, as at 92, so as to fit over the flanges of the strut 19. The chain guard 91 is held in place by screws or bolts fastening it to the flanged sheet metal strut 19.

The driving ratio between the ground wheels and the seeding shaft 11 may be varied by substituting different sizes of gears 51, the gear hanger support member 58 being adjustable toward and away from the axis of the seeding shaft for the purpose of accommodating the different sizes of gears that may be made available. To effect such an adjustment, the bolts 57 are loosened and the gear hanger support 58 shifted into any one of the available positions, such positions being determined by the projections 59 entering one or the other of the sets of recesses in the box end support member receiving them. After the proper position has been secured, the bolts 57 are tightened to fix the gear hanger support member firmly in position. A spring 93 is connected at one end to the gear hanger and at the other end to a fastening 94 carried preferably by the strut 19. The spring 93 serves to yieldingly hold the swinging gear hanger in a position causing the associated gears to mesh in driving relation. However, if the drive should be reversed, the gear hanger automatically permits the gears to ratchet.

Figures 7 and 8 show a modified form of gearing and hanger construction which embodies certain advantages over that described above. Referring now to Figures 7 and 8, in the modified construction each box end bracket of the grain drill is indicated by the reference numeral 101 and is provided with a plurality of openings, instead of the slots 55 and depressions 56 described above. At the front side of each of the box end brackets 101, a single opening 102 is formed, and rearwardly thereof, adjacent the rear side of the bracket 101, three openings 103 are formed. Cooperating with these openings is an associated gear hanger pivot member 105 constructed generally similar to the corresponding member 58 mentioned above, including an upper pair of apertured lugs 106 disposed in a section 107 of the pivot member that is spaced apart laterally from the main body 108 of the pivot member 105. A central portion of the main section 108 is provided with a central boss 111 having a tapped opening 112 therein and, concentric thereof, a shouldered section 113. At the uper side of the member 105, a recess 114 is formed, generally between the shouldered portion 113 and the boss section 111. A swinging gear hanger 116, generally of substantially the same construction as the gear hanger 70 described above, is mounted on the shouldered bracket portion 113. The gear hanger 116 is held in position by a flanged member 118 which carries a lug 119 adapted to seat in the recess 114 and a hollow extended hub section 121, the interior diameter of which is such as to receive the boss 111 whereby the parts are centered when assembled. A plurality of shims 122 are disposed between the member 118 and the laterally inwardly facing shoulder 123 of the pivot member 105. The swinging gear hanger is thus held in position between the face of the pivot member 105 and the adjacent face of the flanged member 118. If undue wear takes place, the change may be accommodated by taking out one or more of the shims 122. A bolt 185 is employed for holding the flanged member 118 in place on the main support bracket 105. The threaded end of the bolt 185 is screwed into the tapped opening 112, the bolt 185 extending through an aperture 186 in a cap 127 which, at its inner side, is held against the outer end portion of the hollow hub section 121. The cap 127 is extended, as at 128, so as to provide a retaining shoulder for a gear 129 that is mounted on the hub portion 121. It will be seen that this construction differs from that shown in Figure 3 in so far as a separate part, namely, the member 118, is utilized for holding the swinging gear hanger in position independently of the gear 129, which corresponds to the gear 64 described above. Thus, in the present construction, if the intermediate gear 129 should become loose, through wear or from other causes, the proper positioning and action of the swinging gear hanger will not be affected.

Cap screws 131 are employed for holding the gear hanger pivot member 105 in different positions of adjustment relative to the box end bracket 101. One of the bolts 131 is disposed in the single opening 102 while the other bolt is disposed in the opening in the other lug 106 and in a selected one of the openings 103, depending upon the particular gear to be meshed with the gear 129. When the cap screws or bolts 131 are tightened, the gear hanger pivot member is firmly and positively held in position, and by providing different holes for the bolt opposite the bolt in the opening 102, I provide a definite and easily determined position for the pivot member, especially since when changing the position of the latter it is necessary only to remove one bolt and loosen the other, pivoting the gear hanger pivot member on the bolt that extends through the opening 102.

Figures 9 and 10 disclose a modified form of chain guard housing, differing from that described above in that it may be applied after the driving parts from the ground wheel to the feeding shaft have been assembled on the grain drill. Referring now to Figures 9 and 10, the chain guard housing is indicated in its entirety by the reference numeral 140 and comprises a main plate member 141, which may be ribbed, as at 143, for strength. The member 141 is provided with a narrow flange 142 and, at its lower end, with a downwardly facing notch 144. A marginal member, preferably in the form of a band section 147, completes the chain guard housing. The band or marginal section 147 is disposed about the flange 142. The band section 147 is wider at its lower end portion, as at 148, than at its upper portion 149. The wider lower section 148 is adapted to extend underneath the main frame angle at that side of the drill, as is the corresponding part in the chain guard shown in Figure 1. The band section 147 is spot welded, or is fastened by any other suitable means, such as bolts 150, to the flange 142 at different points around the latter except that at one side the spot welding is omitted and, in lieu thereof, a pair of clips 151 and 152 are fixed to the plate section 141 and cooperate with corresponding clips 153 and 154 which are carried by one lower end portion of the band section 147. The clips and brackets 151—154 are apertured to receive fastening bolts 157. When the latter are loosened and removed, the marginal end section 160, thus loosened, may be temporarily bent outwardly away from the plate section 141 and the entire chain guard assembly inserted into position over the wheel hub and lower sprocket pinion, after which the marginal section may be bent back into position and the bolts 157 inserted and tightened, thus being brought to the position shown in Figure 8. The chain guard 140, like that shown in Figure 1, may be held in position against the associated end of the grain drill frame by any suitable frame, such as clips 158 or other suitable means.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desired to secure by Letters Patent is:

1. For use in a grain drill having a frame, and a driving gear member and a driven gear member journaled thereon, the improvement comprising a gear hanger, a pair of intermeshing gears journaled thereon, a gear hanger support member upon which said gear hanger is swingably mounted about an axis coinciding with one of said gears, means for mounting said gear hanger support member on said frame in a position meshing said one gear of said intermeshing gears with one of said gear members and providing for the swinging movement of said gear hanger carrying the other of said intermeshing gears into and out of mesh with the other of said gear members, and means for fixing said support member in different positions of adjustment relative to said frame to accommodate disposing different sizes of gears on said gear hanger in mesh with said one gear member.

2. For use in a grain drill, a supporting member having a plurality of openings therein, and a driving gear member and a driven gear member journaled thereon, the improvement comprising a gear hanger support member adapted to be attached to said supporting member, a gear hanger swingably mounted on said gear hanger support member, a pair of intermeshing gears journaled on said gear hanger in a position such that the axis of one of said gears coincides with the axis of swinging of said gear hanger on said gear hanger support and meshes with one of said gear members, and means carried by said support member and disposable in selected openings in the supporting member for fixing said gear hanger support member thereto in different positions, optionally to accommodate disposing different sizes of gears on said gear hanger in mesh with said one gear member.

3. In a grain drill or the like, a gear hanger support member comprising a pair of separable parts, one having a shoulder thereon, a swinging gear hanger mounted on said shoulder, means for fastening the other part of said gear hanger support section to said first part so as to confine said swinging gear hanger therebetween.

4. A gear hanger support member comprising a first part having a central boss and a gear hanger receiving section, and a second part having an opening adapted to receive said boss and gear hanger retaining means for retaining said gear hanger on said gear hanger receiving section.

5. The invention set forth in claim 4, further characterized by means on said second part to receive a gear with which a gear on the gear hanger is adapted to mesh, and common means for holding said gear on said second part and the latter in position relative to said one part.

6. In a grain drill having a supporting member at one end thereof, a seeding shaft supported thereby, and a gear on said shaft adjacent said supporting member, a gear hanger support, a gear carried thereby and adapted to mesh with said first gear, and means for fixing said gear hanger support to said supporting member in different positions relative to said seeding shaft, so as to accommodate different sizes of gears on said seeding shaft.

7. In a grain drill or the like, a swinging gear hanger support comprising a first part having a gear hanger receiving section and a central section, a second part adapted to be fixed to said first part and including a central section cooperating with the central section of said first part for holding said parts in the proper relative position, and means on said second part for retaining the gear hanger on said gear hanger receiving section.

8. In a grain drill or the like, a gear hanger support comprising a first part having a gear hanger receiving section, a swinging gear hanger mounted on said gear hanger receiving section, a second part adapted to be fixed to said first part and having means for holding said swinging gear hanger on said gear hanger receiving section, means for securing said parts together, and means for insuring proper registry of said parts when they are secured together.

9. The invention set forth in claim 8, further characterized by a gear on said swinging gear hanger, and a gear on said second part meshing with said hanger gear.

10. In a grain drill having a gear rotatable about an axis and frame means upon which said gear is mounted for rotation, a gear hanger support member, a gear hanger swingably mounted on said support member for movement relative thereto about an axis, a gear mounted on said support member concentric with respect to said latter axis and adapted to be disposed in meshing relation with respect to said grain drill gear, and means for fixing said gear hanger support member to said grain drill frame means in different optional positions with respect to said grain drill gear so as to accommodate the removal of one or both of said gears and the replacement thereof by gears of different diameters.

11. In a grain drill, frame means, support means thereon, a seeding shaft rotatably carried by said support means and having a gear thereon, a gear hanger supporting member having a gear thereon adapted to mesh with said first gear, a swinging gear hanger swingably mounted on said support member for movement relative thereto about the axis of said second mentioned gear, said support member having a pair of slots therein, fastening means passing through said slots for clamping said support member to said end support in different positions of adjustment so as to accommodate different sizes of gears.

12. The invention set forth in claim 11, further characterized by said end support having a plurality of recesses defining the different positions which said gear hanger support member may take, and means on said gear hanger support member for disposition in selected recesses to retain said adjustment.

13. In a grain drill, a rotatable jackshaft having a gear thereon, a seeding shaft having a gear thereon, a gear hanger, a hanger support, an intermediate gear thereon adapted to mesh with said second gear, means for fixing said hanger support to the drill in different optional positions relative to said second gear so as to accommodate different sizes of the latter and/or said intermediate gear, means for pivotally connecting said gear hanger on said hanger support for swinging movement about the axis of said intermediate gear in any position of adjustment of said hanger support relative to said second gear, and a gear carried by said gear hanger in mesh with said intermediate gear and adapted to mesh with said first gear.

14. In an agricultural implement, frame means, support means thereon, a shaft rotatably carried by said support means and having a gear thereon, a gear hanger supporting member having a gear thereon adapted to mesh with said first gear, a swinging gear hanger swingably mounted on said support member for movement relative thereto about the axis of said second mentioned gear, said support member having a pair of slots therein, fastening means passing through said slots for clamping said support member to said end support in different positions of adjustment so as to accommodate different sizes of gears.

15. For use in an agricultural implement comprising frame means, support means thereon, a shaft rotatably carried by said support means and having a gear thereon, and disconnect means mounted on said frame means forward of said shaft, the improvement comprising a gear hanger supporting member having a gear thereon adapted to mesh with said first gear, a swinging gear hanger swingably mounted on said support member for movement relative thereto about the axis of said second mentioned gear, said support member having means at one side thereof for pivotally receiving said gear hanger supporting member, and means adjacent the other side for fixing said support member to said frame means below said shaft and first mentioned gear in different positions of adjustment so as to accommodate different sizes of gears, said gear hanger including a section extending forwardly into operative relation with said disconnect means.

16. For use in a grain drill or the like including a supporting part and frame means receiving said part and including a portion extending inwardly of said part, the improvement comprising a gear hanger pivot member having an upper pair of lugs and a laterally outwardly disposed lower portion adapted to clear said inwardly extending frame portion when said lugs are fixed to said supporting part, and means for fixing said lugs to said supporting part.

17. A gear hanger pivot member as defined in claim 16, further characterized by said lugs being apertured, attaching bolts disposable in said apertures, and said supporting part having an aperture to receive the bolt carried by one of said lugs and a plurality of apertures for receiving the bolt carried by the other lug in a plurality of positions on said part.

WILLIAM A. HYLAND.

REFERENCES CITED

The following references are of record in the file of this patent:

UNITED STATES PATENTS

| Number | Name | Date |
|---|---|---|
| 37,345 | Ingels | Jan. 6, 1863 |
| 628,406 | Griswold | July 4, 1889 |
| 629,994 | Heath | Aug. 1, 1899 |
| 649,280 | Dover | May 8, 1900 |
| 670,214 | Tonko | Mar. 19, 1901 |
| 966,391 | Fillingham | Aug. 2, 1910 |
| 1,770,641 | Brennan | July 15, 1930 |
| 2,053,794 | Keith et al. | Sept. 8, 1936 |
| 2,053,795 | Keith et al. | Sept. 8, 1936 |
| 2,308,081 | Hyland et al. | Jan. 12, 1943 |
| 2,391,975 | Hyland et al. | Jan. 1, 1946 |

FOREIGN PATENTS

| Number | Country | Date |
|---|---|---|
| 2,223 | Great Britain | May 26, 1876 |
| 7,617 | Germany | Dec. 10, 1879 |